US012677342B2

(12) United States Patent
Kim et al.

(10) Patent No.: US 12,677,342 B2
(45) Date of Patent: Jul. 7, 2026

(54) METHOD AND DEVICE FOR MANAGING ROAMING SESSION FOR EDGE COMPUTING SERVICE

(71) Applicant: SAMSUNG ELECTRONICS CO., LTD., Suwon-si (KR)

(72) Inventors: Hyesung Kim, Suwon-si (KR); Jaehyeon Bae, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 18/807,735

(22) Filed: Aug. 16, 2024

(65) Prior Publication Data

US 2025/0063623 A1 Feb. 20, 2025

(30) Foreign Application Priority Data

Aug. 18, 2023 (KR) ........................ 10-2023-0108559

(51) Int. Cl.
*H04W 76/22* (2018.01)
*H04L 61/4541* (2022.01)
(Continued)

(52) U.S. Cl.
CPC ......... *H04W 76/22* (2018.02); *H04L 61/4541* (2022.05); *H04L 67/14* (2013.01); *H04L 67/51* (2022.05)

(58) Field of Classification Search
CPC ....... H04W 76/22; H04W 8/20; H04W 88/14; H04L 61/4541; H04L 67/14;
(Continued)

(56) References Cited

U.S. PATENT DOCUMENTS 10,673,618 B2 6/2020 Suthar et al.
2020/0260525 A1* 8/2020 Gan ...................... H04W 76/11
(Continued)

FOREIGN PATENT DOCUMENTS

KR 10-2020-0032665 A 3/2020
WO 2023075214 A1 5/2023

OTHER PUBLICATIONS

International Search Report and Written Opinion of the International Searching Authority dated Nov. 6, 2024, in connection with International Application No. PCT/KR2024/012177, 7 pages.
(Continued)

*Primary Examiner* — Tonia L Dollinger
*Assistant Examiner* — Joseph M Cousins

(57) ABSTRACT

The disclosure relates to a 5G or 6G communication system for supporting a higher data transmission rate. A method for operating a home-session management function (H-SMF) in a wireless communication system, according to an embodiment, may comprise transmitting a first message requesting subscription data for a packet data unit (PDU) session to a unified data management (UDM), receiving, from the UDM, a second message including the subscription data and information about allowing routing of roaming traffic to an edge hosting environment (EHE) of a home network, and selecting a home-edge application server discovery function (H-EASDF) based on the second message.

13 Claims, 8 Drawing Sheets

(51) Int. Cl.
_H04L 67/14_ (2022.01)
_H04L 67/51_ (2022.01)

(58) Field of Classification Search
CPC . H04L 61/4511; H04L 67/51; H04L 41/0894;
H04L 67/289
See application file for complete search history.

(56) References Cited

U.S. PATENT DOCUMENTS

| | | |
|---|---|---|
| 2023/0116405 A1 | 4/2023 | Lee et al. |
| 2024/0236840 A1* | 7/2024 | Li .......................... H04W 48/18 |
| 2025/0193663 A1* | 6/2025 | Long ..................... H04W 12/06 |
| 2025/0219897 A1* | 7/2025 | Xu ...................... H04L 41/0894 |

OTHER PUBLICATIONS

3GPP TR 23.700-48 V18.0.0 (Dec. 2022) Technical Report, 3rd Generation Partnership Project; Technical Specification Group Services and System Aspects; 5G System Enhancements for Edge Computing; Phase 2 (Release 18), Dec. 2022, 196 pages.
3GPP TS 23.502 V18.2.0 (Jun. 2023) Technical Specification, 3rd Generation Partnership Project; Technical Specification Group Services and System Aspects; Procedures for the 5G System (5GS); Stage 2 (Release 18), Jun. 2023, 895 pages.

\* cited by examiner

LBO roaming

Home EHE access via HR PDU Session

Home EHE access via LBO PDU Session 510        520        530

Transceiver    Controller    Storage 610        620        630

Transceiver    Controller    Storage

METHOD AND DEVICE FOR MANAGING ROAMING SESSION FOR EDGE COMPUTING SERVICE

CROSS-REFERENCE TO RELATED APPLICATION

This application is based on and claims priority under 35 U.S.C. § 119 to Korean Patent Application No. 10-2023-0108559, which was filed in the Korean Intellectual Property Office on Aug. 18, 2023, the entire disclosure of which is incorporated herein by reference.

BACKGROUND

1. Field

The present disclosure relates to a wireless communication system and, more specifically, to a protocol data unit (PDU) session management method related to edge computing service traffic of a roaming user equipment (UE) in a wireless communication system.

2. Description of Related Art 5G wireless communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6 G wireless communication technologies (referred to as Beyond 5G systems) in terahertz bands (for example, 95 GHz to 3 THz bands) in order to accomplish transmission rates fifty times faster than 5G wireless communication technologies and ultra-low latencies one-tenth of 5G wireless communication technologies.

At the beginning of the development of 5G wireless communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G wireless communication technologies in view of services to be supported by 5G wireless communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G wireless communication systems are commercialized, connected devices that have been exponentially increasing will be connected to communication networks, and it is accordingly expected that enhanced functions and performances of 5G wireless communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G wireless communication systems will serve as a basis for developing not only new waveforms for providing coverage in terahertz bands of 6G wireless communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G wireless communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The present disclosure provides a PDU session management method related to edge computing service traffic of a roaming UE in a wireless communication system.

A method for operating a home-session management function (H-SMF) in a wireless communication system, according to an embodiment, may comprise transmitting a first message requesting subscription data for a packet data unit (PDU) session to a unified data management (UDM), receiving, from the UDM, a second message including the subscription data and information about allowing routing of roaming traffic to an edge hosting environment (EHE) of a home network, and selecting a home-edge application server discovery function (H-EASDF) based on the second message.

A home-session management function (H-SMF) in a wireless communication system according to an embodiment may comprise a transceiver and a controller. The controller may transmit a first message requesting subscription data for a packet data unit (PDU) session to a unified data management (UDM), receive, from the UDM, a second message including the subscription data and information about allowing routing of roaming traffic to an edge hosting environment (EHE) of a home network, and select a home-edge application server discovery function (H-EASDF) based on the second message.

Embodiments of the disclosure may control to efficiently route specific service traffic of a roaming UE to a designated edge hosting environment of a home network.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

FIGS. 1A through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operational principle of the disclosure is described below with reference to the accompanying drawings. The terms described below are ones defined considering functions in the disclosure. Since the terms may be varied according to the user's or operator's intent or custom, their definitions should be determined according to the contents throughout the disclosure.

The terms referring to network entities or network functions and objects of an edge computing system as used herein, the terms referring to messages, and the term referring to identification information are provided as an example for ease of description. Thus, the disclosure is not limited by the terms, and such terms may be replaced with other terms denoting objects with equivalent technical concept.

Although terms and names as defined in the 5G system standard are used herein for ease of description, embodiments of the disclosure are not limited thereto or thereby, and the same may apply likewise to systems conforming to other standards.

Figure 1A:
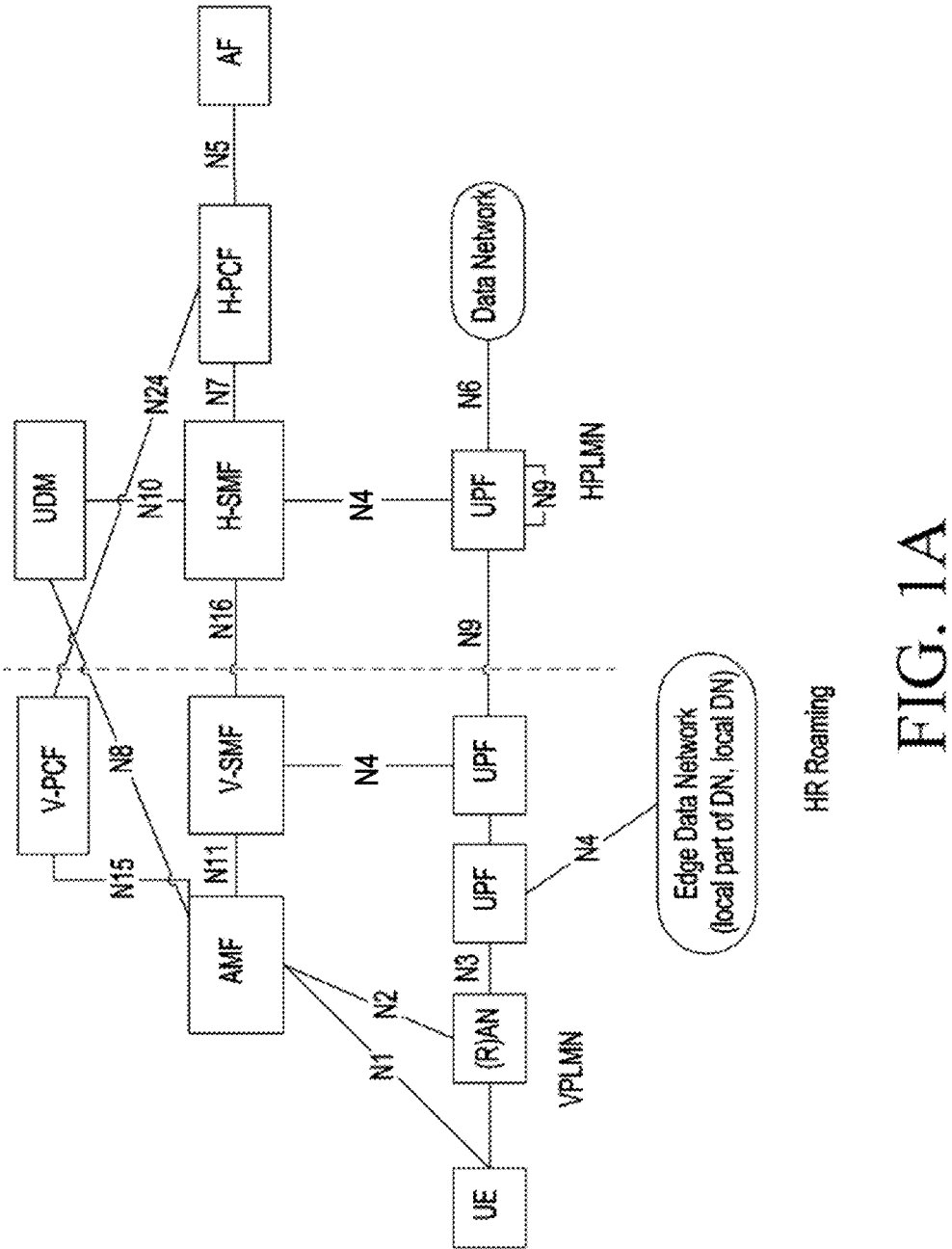
FIG. 1A illustrates an example of a 5G system structure for HR roaming according to various embodiments of the present disclosure.
Figure 1B:
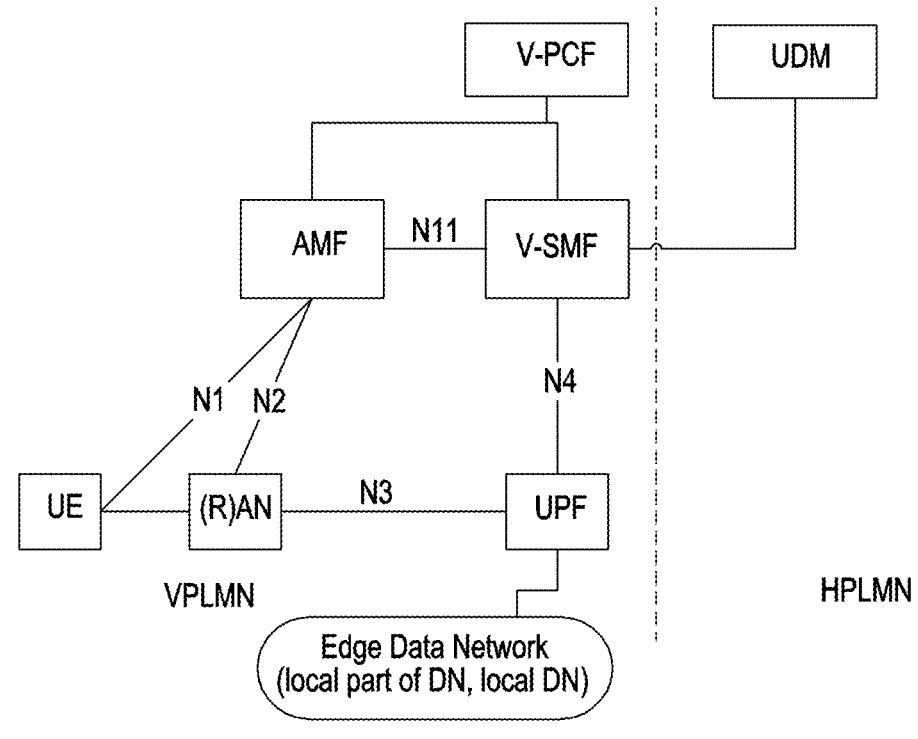
FIG. 1B illustrates an example of a 5G system structure for LBO roaming according to various embodiments of the present disclosure.

FIGS. 1A and 1B illustrate a 5G system structure supporting an edge computing roaming service according to an embodiment.

A 5G system structure supporting an edge computing service may include various network functions (NFs), some of which are illustrated in FIGS. 1A and 1B, such as an access and mobility management function (AMF), a session management function (SMF), a policy control function (PCF), unified data management (UDM), a data network (DN), or a local part of DN capable of local access to the data network, a user plane function (UPF), a (radio) access network ((R)AN), and a user equipment (UE).

Each NF supports the following functions:

AMF provides functions for per-UE access and mobility management and may connect basically to one AMF per UE;

DN means, e.g., an operator service, Internet access, or a third party service. The DN transmits a downlink protocol data unit (PDU) to the UPF or receives a PDU transmitted from a UE from a UPF. Local part of DN means a data network having a short data transmission path as it may local-access a portion of the DN. It may be used to denote a DN where an edge application server supporting an edge computing service is deployed. Edge data network means a data network where an edge computing server is disposed. It may be considered as a local part of the data network or local data network;

PCF receives information about packet flow from application server and provides the function of determining the policy such as mobility management or session management. Specifically, the PCF supports functions such as support of a signaled policy framework for controlling network operations, providing a policy rule to allow CP function(s) (e.g., AMF or SMF) to execute a policy rule, and implementation of a front end for accessing subscription information related to policy decision in the unified data repository (UDR);

SMF provides session management function and, if a UE has multiple sessions, this may be managed per session by a different SMF;

UDM stores, e.g., user's subscription data, policy data;

UPF transfers downlink PDU received from DN to the UE via (R)AN and transfers uplink PDU received from the UE to the DN via (R)AN. Uplink classifier (ULCL) refers to a UPF having a function of classifying and transmitting uplinks. Local UPF (L-UPF) serves as a PDU session anchor of a session transmitted to the local part of DN; and EASDF processes the domain name system query transmitted by the UE according to the rule provided from the SMF. For example, the operations of transferring the domain name system (DNS) query transmitted from the UE to the DNS server, receiving a DNS response, transmitting related reporting to the SMF, and providing a DNS response to the UE may be performed.

FIG. 1A illustrates an example of a 5G system structure for home routing (HR) roaming and FIG. 1B illustrates an example of a 5G system structure for local breakout (LBO) roaming according to various embodiments of the present disclosure.

In FIG. 1A, for HR roaming, a visited public land mobile network (VPLMN) may include a UE, an (R)AN, a UPF, an AMF, a visited-SMF (V-SMF), and a visited-PCF (V-PCF), and a home public land mobile network (HPLMN) may include a UPF, a data network (DN), a home-SMF (H-SMF), a home-PCF (H-PCF), an AF, and a UDM. In FIG. 1B, for LBO roaming, the VPLMN may include a UE, an (R)AN, a UPF, an AMF, a V-SMF, and a V-PCF, and the HPLMN may include a UDM.

Figure 2A:
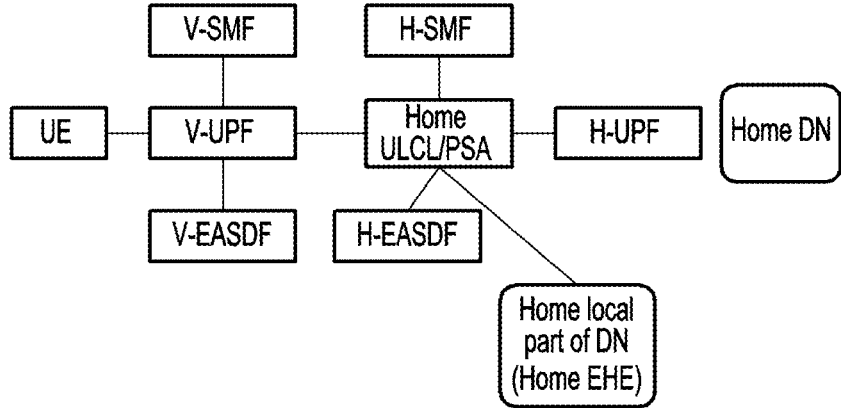
FIGS. 2A and 2B illustrate an example of structure for routing specific service traffic of a roaming UE to an edge hosting environment disposed in a local part of a DN of a home network according to various embodiments of the present disclosure.
Figure 2B:
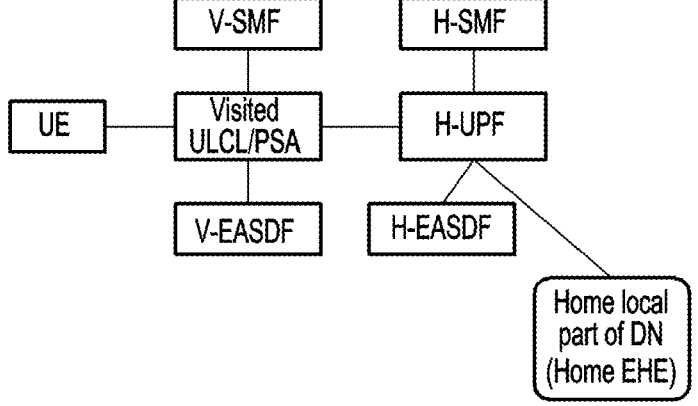

FIGS. 2A and 2B illustrate an example structure for supporting for routing specific service traffic of a roaming UE to an edge hosting environment disposed in a local part of a DN of a home network according to various embodiments of the present disclosure.

Referring to FIG. 2A, for a UE receiving a roaming service through an HR PDU session, a home-UPF (H-UPF) may branch a session, and information about an edge application server discovery function (H-EASDF) capable of providing addresses of application servers disposed in a home local part of a DN may be provided to a network function of the UE or the VPLMN.

Referring to FIG. 2B, a V-UPF and an H-UPF that act as anchors of an LBO PDU session may be connected for a UE that receives a roaming service through the LBO PDU session, and the H-UPF may be configured to act as an anchor of a PDU session for a home local part of a DN.

Figure 3A:
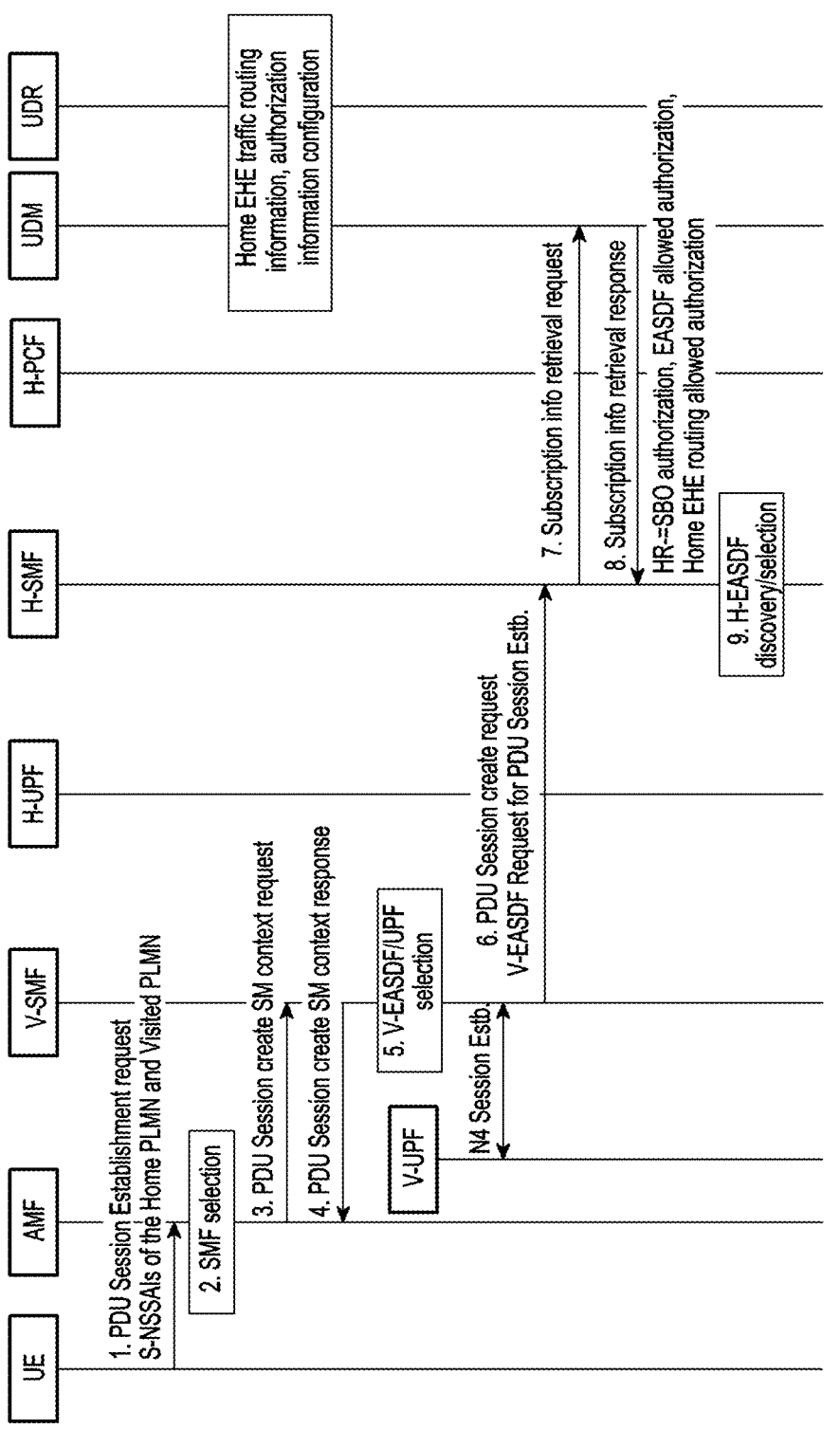
FIGS. 3A and 3B illustrate a method for routing roaming traffic to an EHE of a home network through an HR PDU session according to various embodiments of the present disclosure.
Figure 3B:
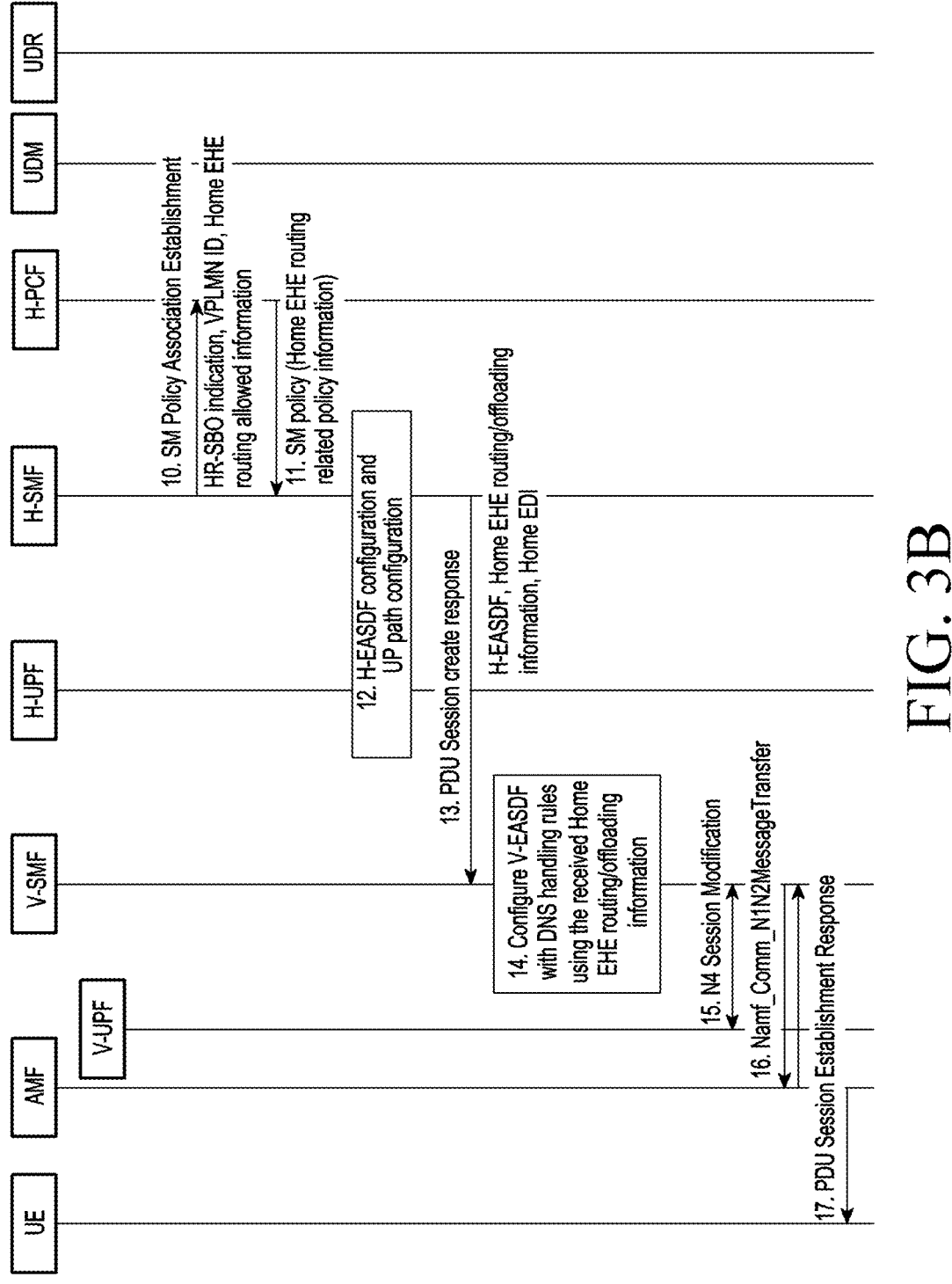

FIGS. 3A and 3B illustrate a method for routing roaming traffic to an EHE of a home network through an HR PDU session according to various embodiments of the present disclosure. Here, EHE may refer to a hosting environment or a data center disposed in a local part of DN of a home network.

The main operations of the H-SMF in FIGS. 3A and 3B are as follows. The H-SMF may determine whether the session of the specific UE may be routed to the home EHE during roaming or whether the UE is a UE where the corresponding routing is allowed. Such an operation may be determined as the H-SMF obtains authorization information about whether to allow routing to the home EHE during roaming in the VPLMN where the UE is currently roaming for a specific session of a specific UE from the UDM.

According to an embodiment, it may be determined to be allowed if related authorization information is provided from the UDM during the PDU session generation/modification procedure. The corresponding authorization information may be configured for each UE, VPLMN, DNN, and S-NSSAI. The H-SMF may obtain information necessary to identify traffic to be routed to the home EHE for the PDU session with the corresponding UE. Such information may be obtained from the UDM or PCF, and may be information that may include an FQDN list, an IP address range, or an application ID of access to home EHE allowed traffic.

The H-SMF may configure a DNS handling rule in the EASDF to process the DNS query for the corresponding traffic (traffic to be routed to the home EHE). According to an embodiment, the H-SMF may provide DNS handling rule and home deployment information (EDI) to the V-SMF to configure in the V-EASDF. The H-SMF may perform a subscription for generation of a DNS query to the V-SMF, receive a notification for generation of a DNS query for a home EHE routing target service, receive the corresponding notification, and prepare/perform the UP path configuration to facilitate routing to the home EHE.

According to an embodiment, the H-SMF may provide the H-EASDF information to the V-SMF so that the V-EASDF forwards the DNS query for the home EHE routing target service to the H-EASDF (V-UPF and H-ULCL configuration). In this case, the H-SMF may receive notification of DNS query generation from the H-EASDF and perform UP configuration. Apart from the notification for the generation of such DNS query, the H-SMF may perform UP configuration so that routing to home EHE is allowed during PDU session generation and DNS query may be routed to H-EASDF. According to an embodiment, H-ULCL insertion and provisioning packet detection rule (PDR) and forward and action rule (FAR) may be performed on the HR PDU session. PDR and FAR may be a rule for home EHE routing target traffic and a rule for allowing DNS queries related to the service traffic to be transmitted to H-EASDF.

The entire procedure of FIGS. 3A and 3B including the operations of the SMF as described above is as follows.

1. The UE may transmit a PDU session generation request to the AMF.

2. The AMF may select a V-SMF. When HR-SBO is supported for the roaming UE, an SMF supporting HR-SBO may be selected.

3. The AMF may transmit a PDU session generation request message to the V-SMF. The corresponding message may include an HR-SBO indicator.

4. The V-SMF may successfully receive a message and transmit a response to whether it is possible to generate a session supporting HR-SBO to the AMF.

5. When the V-SMF supports HR-SBO, V-EASDF discovery and selection may be performed. When selecting V-EASDF, if it is necessary to support routing to home EHE for the corresponding UE, a V-EASDF that supports connection with H-EASDF or may process DNS queries related to home EHE target traffic may be selected. The V-SMF may also select a V-UPF that supports connection with the H-UPF.

6. The V-SMF may transmit the selected V-EASDF information and the HR-SBO request indicator to the H-SMF. The V-EASDF information may include a V-EASDF IP address and an address and routing information required for connection between the V-EASDF and the H-EASDF.

7. When the H-SMF receives a PDU session generation request from the V-SMF, the H-SMF may request subscription data for the UE and the PDU session from the UDM.

8. The UDM may provide subscription data corresponding to the UE identifier, the DNN, the S-NSSAI, and the VPLMN to the H-SMF. When routing of roaming traffic to the EHE of the home network is allowed for the corresponding UE and the session, the home EHE routing allowed authorization information may be included and provided to the H-SMF. The home EHE routing allowed authorization information may be provided together with HR-SBO authorization indication and UE authorization for EAS discovery via EASDF information. Information necessary to identify traffic to be routed to home EHE, together with home EHE routing allowed authorization information, may be provided together. For example, the information may include an FQDN list, an IP address range, or an application ID of access to home EHE allowed traffic.

9. When the H-SMF receives the home EHE routing allowed authorization information from the UDM or determines that routing to the home EHE is necessary for the UE and the DNN/S-NSSAI according to the locally configured operator policy, the H-SMF may perform the H-EASDF discovery and selection procedure. When selecting H-EASDF, H-SMF may consider whether the H-SMF supports DNS query processing for home EHE target traffic or connection with V-EASDF. For example, the H-SMF may discover and select the H-EASDF considering the VPLMN ID, the V-EASDF information, the UE IP address, the home EHE routing target traffic information, and the like.

10. When the home network supports PCF-based policy configuration, the H-SMF may request an HR PDU session-related policy from the H-PCF. The H-SMF may provide the H-PCF with an indicator indicating that HR-SBO is allowed, a VPLMN ID, and indicator information indicating that home EHE routing is allowed. The H-SMF may determine whether to include such information based on the operation result of the previous step. For example, when the H-SMF receives authorization-related information including home EHE routing allowed authorization information from the UDM, the H-SMF may inform the H-PCF that home EHE routing is allowed, and may request a session management policy related to home EHE routing.

11. The H-PCF may provide the H-SMF with home EHE routing-related session management policy. The home EHE routing-related session management policy provided by the H-PCF may be a policy limited to the roaming VPLMN. The home EHE routing-related session management policy may include a VPLMN ID and traffic-related information (FQDN list, IP address range, application ID, etc.) allowed to be routed to the home EHE. This information provided by the H-PCF may be expressed as VPLMN-specific home EHE routing/offloading policy information.

12. The H-SMF may configure the DNS handling rule in the H-EASDF considering the information received from the UDM and the PCF. Further, edge deployment information (home edge deployment information, home EDI) including edge application server (EAS) information hosted/disposed in the home EHE may be obtained from the NEF, and the DNS handling rule may be configured in the H-EASDF considering the same.

13. The H-SMF transmits, to the V-SMF, at least one of home edge deployment information including the UE IP address, H-EASDF information, and edge application server (EAS) information hosted/disposed in the home EHE, the FQDN list of access to home EHE allowed traffic, the IP address range, or the application ID, address information and routing information required for connection generation for DNS message transmission between the V-EASDF and the H-EASDF. The information transmitted by the H-SMF to the V_SMF may be expressed as information constituting VPLMN-specific home EHE routing/offloading policy information, or may be included and provided in one structure called VPLMN-specific home EHE routing/offloading policy information.

14. The V-SMF performs configuration for the V-EASDF using the information received from the H-SMF in the previous step. For example, the V-SMF may configure a DNS handling rule in the V-EASDF considering at least one of VPLMN-specific home EHE routing/offloading policy information, home EDI, and H-EASDF address information.

15. The V-SMF performs an N4 session modification procedure for performing the configuration for the V-UPF using the information received from the H-SMF in the previous step. For example, the V-SMF may perform UP path configuration on the V-UPF considering at least one of VPLMN-specific home EHE routing/offloading policy information, home EDI, and H-EASDF address information. For example, which traffic is routed to the local part of DN of the VPLMN, and which traffic is to be transmitted to the home network may be configured. Further, in the V-UPF, which DNS query message is to be transmitted to V-EASDF and which DNS query message is to be routed to H-EASDF may be configured.

16. The V-SMF may transmit a PDU session generation response message to the AMF to notify the UE that the HR-SBO session generation procedure is successfully performed.

17. The AMF may transmit a PDU session response message to the UE.

Figure 4A:
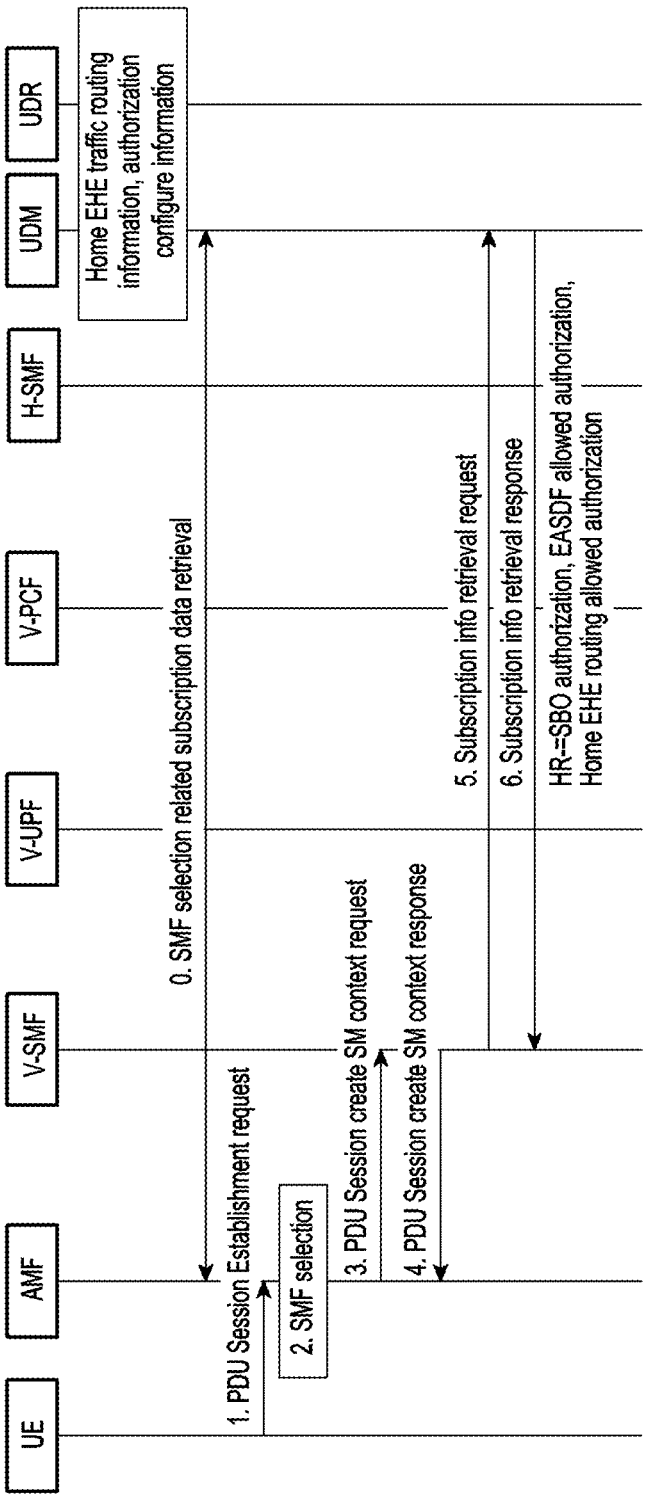
FIGS. 4A and 4B illustrate a method for accessing a home EHE using an LBO PDU session according to various embodiments of the present disclosure.
Figure 4B:
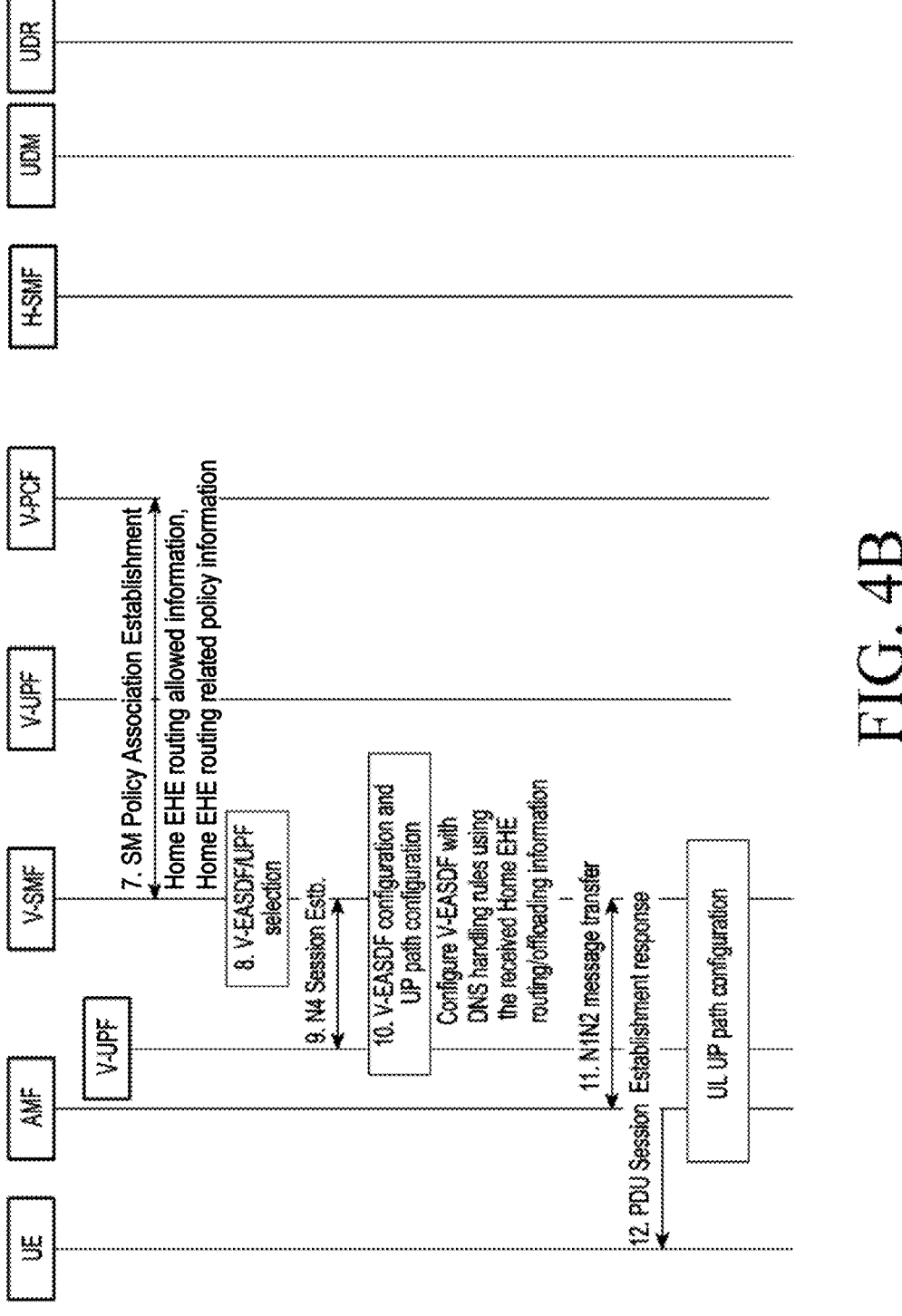

FIGS. 4A and 4B illustrate a method for accessing a home EHE using an LBO PDU session according to various embodiments of the present disclosure.

In an example of the provided procedure, the V-SMF may perform an operation of determining whether a session of a specific UE may be routed to the home EHE during roaming or whether the UE is a UE where the corresponding routing is allowed. This operation may include an operation in which the V-SMF obtains, from the UDM, authorization information about whether the UE allows routing from the VPLMN currently roaming to the home EHE for a specific session (a PDU session that may be identified as a DNN or an S-NSSAI) of the specific UE.

When routing to the home EHE is allowed, the V-SMF may perform an operation for obtaining information about the H-SMF. According to an embodiment, if routing to the home EHE is allowed, the V-SMF may request the H-SMF information from the AMF, or directly perform the H-SMF discovery and selection operation, or use the locally configured H-SMF information. The V-SMF may request and obtain at least one of information necessary for home EHE routing and related DNS handling rule and H-EASDF information from the H-SMF and configure related information in the V-EASDF. Further, the V-SMF may perform UP path configuration on traffic allowed for home EHE routing.

The entire procedure of FIGS. 4A and 4B including the operations of the V-SMF as described above is as follows.

0. The AMF may obtain SMF selection related subscription data related to the roaming UE. The SMF selection related subscription data may include information about whether routing to the home EHE of the HPLMN is allowed and supported for some traffic when roaming in a specific VPLMN for a specific session (DNN or S-NSSAI) of the corresponding UE. This information may be considered for the AMF to discover and select the V-SMF.

1. The UE may transmit a PDU session generation request to the AMF.

2. The AMF may select a V-SMF. When routing to the home EHE of the HPLMN is allowed or supported for the roaming UE, the SMF supporting the home EHE routing management function may be selected.

3. The AMF may transmit a PDU session generation request message to the V-SMF. This message may include information about allowing routing to the home EHE.

4. The V-SMF may successfully receive a message and transmit a response to whether it is possible to generate a session supporting routing to the home EHE to the AMF.

5. When the V-SMF receives the PDU session generation request, the V-SMF may request subscription data for the corresponding UE and the PDU session (information that may be identified by the DNN or the S-NSSAI) from the UDM.

6. The UDM may provide subscription data corresponding to the UE identifier, the DNN, the S-NSSAI, and the VPLMN to the V-SMF. When routing of roaming traffic to the EHE of the home network is allowed for the corresponding UE and session, the home EHE routing allowed authorization information may be included and provided to the V-SMF. The home EHE routing allowed authorization information may be provided together with HR-SBO authorization indication and UE authorization for EAS discovery via EASDF information. Information necessary to identify traffic to be routed to home EHE, together with home EHE routing allowed authorization information, may be provided together. For example, the information may include an FQDN list, an IP address range, or an application ID of access to home EHE allowed traffic. Further, the H-EASDF capable of processing the DNS query for the service that may be routed to the home EHE in the UDM may be configured, and the corresponding H-EASDF information may be provided to the V-SMF.

7. The V-SMF may request a PDU session-related policy from the V-PCF. The V-SMF may provide indicator information indicating that HPLMN ID and home EHE routing are allowed to the V-PCF. For example, the V-SMF may determine whether to include such information based on the operation result of the previous step. For example, when the V-SMF receives authorization-related information including home EHE routing allowed authorization information from the UDM, the V-SMF may notify the V-PCF that home EHE routing is allowed, and may request a session management policy related to home EHE routing.

The V-PCF may provide the V-SMF with the home EHE routing-related session management policy. The home EHE routing-related session management policy provided by the V-PCF may be a policy limited to the roaming VPLMN and HPLMN. The home EHE routing-related session management policy may include a VPLMN ID and traffic-related information (FQDN list, IP address range, application ID, etc.) allowed to be routed to the home EHE. This information provided by the V-PCF may be expressed as VPLMN-specific home EHE routing/offloading policy information.

8. The V-SMF may perform V-EASDF and V-UPF discovery and selection. If home EHE routing is allowed for the session, the V-UPF and V-EASDF supporting home EHE routing may be discovered and selected. For example, a V-UPF supporting DNAI of the data network in which the home EHE is positioned may be selected. Further, V-EASDF supporting connection with H-EASDF may be selected, or V-UPF supporting DNS query routing to H-EASDF may be selected.

9. The V-SMF may perform the UP path configuration on the V-UPF using at least one of the information obtained in the previous step from the UDM or the V-PCF, the V-EASDF information, or the H-EASDF information, or using the locally configured home EHE routing/offloading policy information. Such an operation may be performed through an N4 session establishment procedure. For example, which traffic is routed to the local part of DN of the VPLMN, and which traffic is to be transmitted to the home network may be configured. Further, in the V-UPF, which DNS query message is to be transmitted to V-EASDF and which DNS query message is to be routed to H-EASDF may be configured.

10. The V-SMF may configure the DNS handling rule in the V-EASDF considering the information received from the UDM and the PCF. Further, edge deployment information (home edge deployment information, home EDI) including edge application server (EAS) information hosted/disposed in the home EHE may be obtained from the NEF, and the DNS handling rule may be configured in the V-EASDF considering the same. The V-SMF may configure a DNS handling rule in the V-EASDF considering at least one of home EDI, H-EASDF, and home EHE routing/offloading policy information. The operation of step 10 may be performed before step 9, and when performed before step 9, the V-SMF may perform a configuration of the V-UPF considering the V-EASDF information.

11. The V-SMF may transmit a PDU session generation response message to the AMF to notify the UE that the PDU session generation procedure is successfully performed.

12. The AMF may transmit a PDU session response message to the UE.

Figure 5:
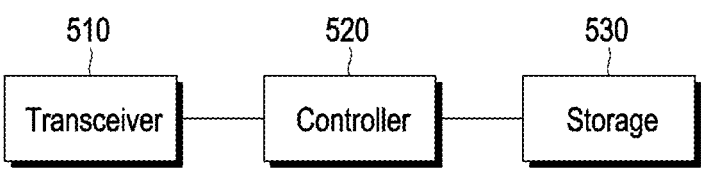
FIG. 5 illustrates a UE according to various embodiments of the present disclosure.

FIG. 5 illustrates a UE according to various embodiments of the preset disclosure.

In the embodiment of FIG. 5, a UE may be the UE or the UE device shown in each of FIGS. 1 to 4B.

Referring to FIG. 5, the UE may include a transceiver 510, a controller 520, and a storage 530. In the disclosure, the controller may be defined as a circuit or application-specific integrated circuit or at least one processor.

The transceiver 510 may transmit and receive signals to/from a base station or a network entity. The transceiver 510 may transmit/receive data to/from the base station or the network entity using, e.g., wireless communication.

The controller 520 may control the overall operation of the UE according to an embodiment. For example, the controller 520 may control the signal flow between the blocks to perform the operations described in connection with FIGS. 1 to 4B.

The storage 530 may store at least one of information transmitted/received via the transceiver 510 and information generated via the controller 520. For example, the storage 530 may store information and data necessary for the method described above with reference to FIGS. 1 to 4B.

Figure 6:
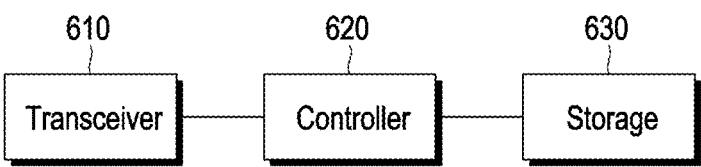
FIG. 6 illustrates a network entity according to various embodiments of the present disclosure.

FIG. 6 illustrates a network entity according to various embodiments of the present disclosure.

In the embodiment of FIG. 6, the network entity may be implemented as one of the AMF, V-SMF, V-UPF, V-PCF, H-UPF, H-SMF, H-PCF, UDM, and UDR shown in each of FIGS. 1 to 4B.

Referring to FIG. 6, the network entity may include a transceiver 610, a controller 620, and a storage 630. In the disclosure, the controller may be defined as a circuit or application-specific integrated circuit or at least one processor.

The transceiver 610 may transmit and receive signals to/from the UE, the base station, or another network entity. The transceiver 610 may transmit/receive data to/from the UE, base station or the other network entity using, e.g., wireless communication.

The controller 620 may control the overall operation of the network entity according to an embodiment. For example, the controller 620 may control the signal flow between the blocks to perform the operations described in connection with FIGS. 1 to 4B.

The storage 630 may store at least one of information transmitted/received via the transceiver 610 and information generated via the controller 620. For example, the storage 630 may store information and data necessary for the method described above with reference to FIGS. 1 to 4B.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for operating a home-session management function (H-SMF) in a wireless communication system, the method comprising:

transmitting, to a unified data management (UDM), a first message requesting subscription data for a packet data unit (PDU) session;

receiving, from the UDM, a second message including the subscription data and information about allowing routing of roaming traffic to an edge hosting environment (EHE) of a home network; and discovering a home-edge application server discovery function (H-EASDF) based on at least one of visited public land mobile network (VPLMN) ID, visited EASDF (V-EASDF) information, user equipment (UE) IP address, or home EHE routing target traffic information.

2. The method of claim 1, further comprising:

when a home network supports a policy control function (PCF)-based policy configuration, requesting a home routing (HR) PDU session-related policy to a home-policy control function (H-PCF); and receiving, from the H-PCF, an EHE routing-related session management policy of the home network.

3. The method of claim 2, further comprising:

configuring a domain name system (DNS) handling rule in the H-EASDF.

4. The method of claim 3, further comprising:

receiving, from a network exposure function (NEF), edge application server (EAS) information hosted in the EHE of the home network.

5. The method of claim 1, further comprising:

transmitting, to a visited SMF (V-SMF), at least one of user equipment (UE) IP address, H-EASDF information, edge application server (EAS) information hosted in the EHE of the home network, IP address range, an application ID, or address information required for connection generation for DNS message transmission between a visited EASDF (V-EASDF) and the H-EASDF.

6. The method of claim 1, further comprising:

receiving, from a visited SMF (V-SMF), V-EASDF information including a V-EASDF IP address, an address and routing information required for connection between the V-EASDF and the H-EASDF.

7. A home-session management function (H-SMF) in a wireless communication system, the H-SMF comprising:

a transceiver; and a controller operably coupled to the transceiver, the controller configured to:

transmit, to a unified data management (UDM), a first message requesting subscription data for a packet data unit (PDU) session; receive, from the UDM, a second message including the subscription data and information about allowing routing of roaming traffic to an edge hosting environment (EHE) of a home network; and discover a home-edge application server discovery function (H-EASDF) based on at least one of visited public land mobile network (VPLMN) ID, visited EASDF (V-EASDE) information, user equipment (UE) IP address, or home EHE routing target traffic information.

8. The H-SMF of claim 7, wherein the controller is further configured to:

when a home network supports a policy control function (PCF)-based policy configuration, request a home routing (HR) PDU session-related policy to a home-policy control function (H-PCF); and receive, from the H-PCF, an EHE routing-related session management policy of the home network.

9. The H-SMF of claim 8, wherein the controller is configured to configure a domain name system (DNS) handling rule in the H-EASDF.

10. The H-SMF of claim 9, wherein the controller is configured to:

receive, from a network exposure function (NEF), edge application server (EAS) information hosted in the EHE of the home network.

11. The H-SMF of claim 7, wherein the controller is configured to:

transmit, to a visited SMF (V-SMF), at least one of user equipment (UE) IP address, H-EASDF information, edge application server (EAS) information hosted in the EHE of the home network, IP address range, an application ID, or address information required for connection generation for DNS message transmission between a visited EASDF (V-EASDF) and the H-EASDF.

12. The H-SMF of claim 7, wherein the controller is configured to:

receive, from a visited SMF (V-SMF), V-EASDF information including a V-EASDF IP address, an address and routing information required for connection between the V-EASDF and the H-EASDF.

13. One or more non-transitory computer-readable storage media storing one or more computer programs including computer-executable instructions that, when executed by one or more processors of a device individually or collectively, cause the device to perform operations, the operations comprising:

transmitting, to a unified data management (UDM), a first message requesting subscription data for a packet data unit (PDU) session;

receiving, from the UDM, a second message including the subscription data and information about allowing routing of roaming traffic to an edge hosting environment (EHE) of a home network; and discovering a home-edge application server discovery function (H-EASDF) based on at least one of visited public land mobile network (VPLMN) ID, visited EASDF (V-EASDF) information, user equipment (UE) IP address, or home EHE routing target traffic information.

* * * * *